United States Patent
Friel

(10) Patent No.: US 9,739,017 B2
(45) Date of Patent: Aug. 22, 2017

(54) HIGH FRICTION SURFACE COATING AND METHOD OF MAKING THEREOF

(71) Applicant: Shaun Friel, Letterkenny (IE)

(72) Inventor: Shaun Friel, Letterkenny (IE)

(*) Notice: Subject to any disclaimer, the term of this patent is extended or adjusted under 35 U.S.C. 154(b) by 0 days.

(21) Appl. No.: 15/038,087

(22) PCT Filed: Nov. 26, 2014

(86) PCT No.: PCT/EP2014/075641
§ 371 (c)(1),
(2) Date: May 20, 2016

(87) PCT Pub. No.: WO2017/078901
PCT Pub. Date: Jun. 4, 2015

(65) Prior Publication Data
US 2016/0298301 A1 Oct. 13, 2016

(30) Foreign Application Priority Data
Nov. 26, 2013 (GB) .................................. 1320831.9
Jun. 2, 2014 (GB) .................................. 1409723.2

(51) Int. Cl.
*E01C 7/00* (2006.01)
*E01C 7/35* (2006.01)
(Continued)

(52) U.S. Cl.
CPC .............. *E01C 7/356* (2013.01); *C04B 26/14* (2013.01); *C09D 5/00* (2013.01); *C09D 7/1216* (2013.01);
(Continued)

(58) Field of Classification Search
CPC ......... E01C 7/356; E01C 11/24; C04B 26/14; C04B 2111/00362; C04B 2111/0075;
(Continued)

(56) References Cited

U.S. PATENT DOCUMENTS 3,903,706 A * 9/1975 Gzemski .................. E01C 3/06
106/284.03
3,966,641 A * 6/1976 Csatar ...................... B01J 20/10
502/439
(Continued)

FOREIGN PATENT DOCUMENTS

GB          1455824         11/1976
GB          2437085    *    10/2007   ................ E01F 9/04
(Continued)

OTHER PUBLICATIONS

Sandatlas, Tuff-Igneous Rocks, available from http://www.sandatlas.org/tuff/, accessed May 21, 2015.
(Continued)

*Primary Examiner* — Raymond W Addie
(74) *Attorney, Agent, or Firm* — Gardner, Linn, Burkhart & Flory, LLP

(57) ABSTRACT

A high friction surface coating comprising a resin and an aggregate, the aggregate comprising a blend of calcined bauxite and particles of sandstone and/or Tuff. Optionally, the particles of sandstone and/or Tuff in the aggregate may be from the Paleozoic era, including the Carboniferous, Devonian, Silurian, Ordovician and Cambrian periods.

11 Claims, 1 Drawing Sheet

(51) Int. Cl.
*C04B 26/14* (2006.01)
*E01C 11/24* (2006.01)
*C09K 3/14* (2006.01)
*C09D 5/00* (2006.01)
*C09D 7/12* (2006.01)
*C09D 163/00* (2006.01)
*C04B 111/00* (2006.01)
*C08K 3/00* (2006.01)
*C08K 3/22* (2006.01)

(52) U.S. Cl.
CPC ......... *C09D 7/1283* (2013.01); *C09D 163/00* (2013.01); *C09K 3/149* (2013.01); *E01C 11/24* (2013.01); *C04B 2111/0075* (2013.01); *C04B 2111/00362* (2013.01); *C08K 3/0033* (2013.01); *C08K 3/22* (2013.01); *C08K 2003/2227* (2013.01)

(58) Field of Classification Search
CPC C08K 3/0033; C08K 3/22; C08K 2003/2227; C09D 7/1216; C09D 7/1283; C09D 163/00; C09K 3/149
USPC ............. 404/12, 14, 94, 17, 31, 75; 106/738
See application file for complete search history.

(56) References Cited

U.S. PATENT DOCUMENTS

| | | | | |
|---|---|---|---|---|
| 5,447,387 A | * | 9/1995 | Fagan | E01D 19/125 14/73 |
| 5,919,295 A | * | 7/1999 | Lamba | C09K 3/149 106/36 |
| 5,928,418 A | * | 7/1999 | Tamaki | C08L 95/005 106/277 |
| 2011/0271876 A1 | * | 11/2011 | Alter | C04B 12/005 106/707 |
| 2015/0140294 A1 | * | 5/2015 | Yakopson | E01F 9/042 428/206 |
| 2016/0138228 A1 | * | 5/2016 | Rainwater | E01C 19/21 404/111 |

FOREIGN PATENT DOCUMENTS

| | | |
|---|---|---|
| JP | S53108630 | 9/1978 |
| JP | 2005048001 | 2/2005 |
| JP | 2005315054 | 11/2005 |
| KR | 100835671 | 5/2008 |
| KR | 100855315 | 8/2008 |
| WO | 2005/107975 | 11/2005 |
| WO | 2006/052253 | 5/2006 |

OTHER PUBLICATIONS

Newport Industries, Calcined Bauxite available from http://www.calcined-bauxite.com/, accessed May 29, 2014.

Gritstone, Wikipedia, available from http://en.wikipedia.org/wiki/Gritstone/, accessed May 29, 2014.

PCT Search Report for corresponding PCT Application No. PCT/EP2014/075641, dated Feb. 20, 2015.

* cited by examiner

HIGH FRICTION SURFACE COATING AND METHOD OF MAKING THEREOF

CROSS REFERENCE TO RELATED APPLICATIONS

The present application is a §371 national stage of International Application PCT/EP2014/075641, filed Nov. 26, 2014, which claims the priority benefit of U.K. patent application Ser. No. 1320831.9, filed Nov. 26, 2013, and of U.K. patent application Ser. No. 1409723.2, filed Jun. 2, 2014, all of which are herein incorporated by reference in their entireties.

FIELD OF INVENTION

This invention relates to a high friction surface coating and in particular to a high friction surface coating for application to road surfaces.

BACKGROUND OF THE INVENTION

High friction surfacing (HFS) is an anti-skid road surfacing system installed in areas where the risk of a vehicle skidding accident is high. Examples would be approaches to traffic lights, pedestrian crossings and roundabouts, as well as on steep inclines and dangerous bends. Research has shown that the number of accidents/fatalities can be substantially reduced when HFS systems are installed at high risk locations.

HFS systems comprise of a resin that is applied to an existing road surface substrate. The resin holds and binds a special aggregate comprising calcined bauxite, providing a high performance anti-skid surface. After the HFS system has cured it is opened to traffic.

There are two main categories of HFS, namely Cold Applied and Hot Applied. The cold applied system incorporates a resin binder which is adhered to the road surface substrate. Calcined bauxite aggregates are then broadcast over the resin binder coating. For the hot applied system, the calcined bauxite aggregate and resin binder are pre-mixed together. During installation the pre-mixed material is heated up and mixed in a truck mounted boiler at high temperatures. The material is then screeded over the road surface substrate.

The finished HFS system gives superior performance over other highway materials in terms of skidding resistance (i.e. grip) and as a result increases road safety to the road user at high risk locations.

HFS systems are governed in the UK by the Highway Authorities Product Approval Scheme (HAPAS). HAPAS was set up in 1995 to establish a nationally recognized approval scheme for innovative products and systems used in highway works. The British Board of Agrément (BBA) is the authority which has responsibility for governing the HAPAS scheme. The BBA give guidance for the assessment and certification of HFS systems and for the assessment and surveillance for HFS installers.

The aggregate specified for use in HFS systems is typically 100% calcined bauxite. Calcined bauxite has unique properties which gives it excellent performance in terms of skidding and wear resistance. However, this material is available in very few locations throughout the world. Geologically, it is not available in the UK or Ireland and the two main sources are China and Guyana in South America. As a result, calcined bauxite is very expensive and has a negative impact on the environment having to be shipped half way around the world to get to its desired location.

SUMMARY OF THE INVENTION

According to a first aspect of the present invention there is provided a high friction surface coating comprising a resin and an aggregate, the aggregate comprising a blend of calcined bauxite and particles of sandstone and/or Tuff.

Optionally, the aggregate comprises a blend of calcined bauxite and particles of sandstone or Tuff from the Paleozoic era, including the Carboniferous, Devonian, Silurian, Ordovician and Cambrian periods.

Current highway specifications and practice in the UK and Ireland demand the use of 100% calcined bauxite in HFS systems. A high friction surface coating in accordance with an embodiment of the present invention comprises a blend of calcined bauxite and a natural sandstone and/or Tuff aggregate which has similar properties and performance in terms of skid resistance to calcined bauxite. Such sandstone or Tuff aggregate is available in Ireland and the UK. This will reduce costs of HFS systems and have a positive impact on the environment by optimizing the use of calcined bauxite whilst also making use of a locally available natural aggregate.

These and other objects, advantages and features of the invention will become apparent upon review of the following specification in conjunction with the drawings.

BRIEF DESCRIPTION OF THE DRAWINGS

An embodiment of the present invention will now be described by way of example only, with reference to the accompanying drawings, in which.

DETAILED DESCRIPTION OF THE PREFERRED EMBODIMENTS

Figure 1:
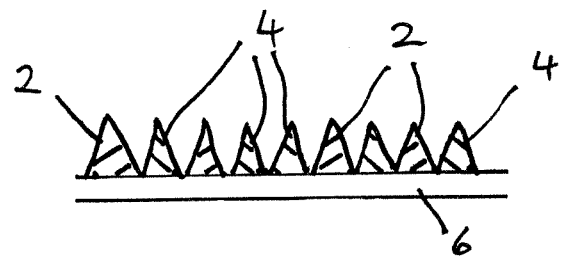
FIG. 1 shows a schematic cross sectional view of a high friction surface coating in accordance with an embodiment of the present invention.

A HFS system in accordance with an embodiment of the present invention comprises a resin binder and a blend of calcined bauxite and a natural sandstone (preferably comprising Carboniferous, Devonian or Silurian sandstone) and/or Tuff aggregate having a particle size of 1-3 mm.

Tuff aggregate is a pyroclastic rock formed by the compaction and lithification of volcanic ash. They are from the Ordovician geological period (approx. 450 million years old).

Specimens of such HFS system have been tested and compared to specimens comprising 100% calcined bauxite and 100% Carboniferous sandstone respectively.

For each aggregate blend tested, three stone mastic asphalt (SMA) slab bases (305×305×50 mm) were made using a Cooper roller compactor. Tape was adhered around the edges of the slab bases to act as formwork to hold epoxy resin in place.

An epoxy resin was poured onto the slab bases and levelled off using a squeegee.

The aggregate product, respectively comprising 100% calcined bauxite, a range of selected blends of calcined bauxite and sandstone in accordance with the present invention and 100% sandstone, were then applied to the epoxy resin of each specimen and evenly spread over the surface.

After curing overnight, the formwork was removed and excess aggregate swept from the surface.

The HFS specimens then underwent initial testing for skid resistance, texture depth and erosion index. After initial testing, the specimens were subjected to simulated trafficking (wear) on a road test machine.

After 100,000 wheel passes of simulated trafficking, the HFS specimens were tested for skid resistance, texture depth and erosion index.

The test results for skid resistance, texture depth and erosion index passed the laboratory performance requirements for HFS systems before and after 100,000 wheel passes on the RTM. Using an initial blend ratio of 50/50 (calcined bauxite/sandstone) the skid resistance value (SRV) was 79. A blend ratio of natural sandstone aggregate and calcined bauxite has been devised that will give a skid resistance value (SRV) of 80+ after 100,000 wheel passes on the RTM. This will provide an extra factor of safety to give confidence in the HFS system of the present invention.

The excellent skidding resistance properties of known HFS systems using calcined bauxite are achieved due to the calcined bauxite's excellent resistance to polishing and wear by car tyres and by the sharp edges retained during the quarry crushing process. The sharp edges dig into the tyres during braking, replicating high stress point loads, and resist the vehicle from sliding out of control.

The majority of road surfacing asphalt materials comprise a combination of different aggregate sizes, with the maximum aggregate sizes typically being 14 mm or 10 mm. The natural sandstone aggregate proposed to be blended with the calcined bauxite in accordance with the present invention would not typically be used in known road surfacing asphalt materials. Although natural aggregate sandstone possesses excellent resistance to polishing by car tyres, the coarser aggregate sizes typically used (14 mm or 10 mm) do not resist wear or abrasion by car tyres and will eventually abrade away over time.

However, when this natural sandstone aggregate is crushed down to the required 1-3 mm size and blended with calcined bauxite for use in the HFS system in accordance with the present invention, it has been shown, during studies by the inventor, that the blended aggregate performs similarly to HFS systems using 100% calcined bauxite and does not suffer from abrasion by car tyres to the same extent as it would in the larger stone size asphalt mixes.

Furthermore, the blend of calcined bauxite and sandstone aggregate shows substantially increased resistance to abrasion and polishing compared to the specimen using 100% sandstone aggregate.

Although a 100% sandstone specimen has been found to achieve a skid resistance value 5 points above the specification limit of 70, it is believed that the 100% sandstone would fail prematurely in-service in terms of durability. This is due to the soft nature of the sandstone and after being exposed to freeze/thaw cycles, snow, rain and heavy traffic stresses premature failure would be inevitable. However, the provision of harder/tougher calcined bauxite in the blend is believed to protect the softer sandstone from wearing away during testing. The calcined bauxite absorbs most of the impact energy during testing whilst allowing the sandstone to maintain high levels of skid resistance.

FIG. 1 illustrates a high friction surface coating in accordance with the present invention comprising a blend or matrix of calcined bauxite particles 2 and a natural sandstone and/or Tuff aggregate 4 bound in an epoxy resin 6. The calcined bauxite and sandstone/Tuff particles have a particle size of between 1-3 mm. A shown in FIG. 1, initially the particles of calcined bauxite 2 and sandstone/Tuff 4 have sharp edges defining a skid resistant surface that provides high grip for vehicle tyres.

Figure 2:
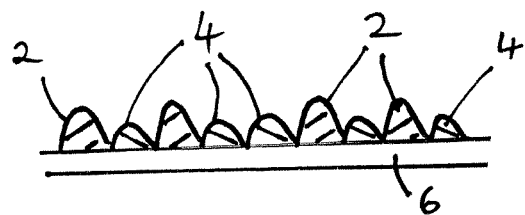
FIG. 2 is a schematic cross sectional view of the surface coating of FIG. 1 after wear.

Over time, wear or polishing occurs to the particles of the blend at the surface of the material. A shown in FIG. 2, at least initially the relatively soft sandstone/Tuff particles 4 wear at a higher rate than the particles of calcined bauxite 2, and hence differential polishing occurs. This can be compared to known high friction surface coatings formed from a single material, where the wear or polishing tends to occur evenly across the surface of the material. Whilst the general polishing tends to remove materials, the differential polishing tends to create relief between the soft and hard minerals. The differential polishing mechanism causes the hard calcined bauxite particles to protect the softer sandstone from quickly polishing or abrading away.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A high friction surface coating comprising a resin and an aggregate, wherein said aggregate comprises a blend of calcined bauxite and particles of sandstone or Tuff, wherein said particles of sandstone or Tuff have a particle size of between 1 mm and 3 mm.

2. A surface coating as claimed in claim 1, wherein said particles of sandstone or Tuff are from the Paleozoic era, including one or more of the Carboniferous, Devonian, Silurian, Ordovician and Cambrian periods.

3. A surface coating as claimed in claim 1, wherein said blend comprises a 50/50 ratio of said calcined bauxite to said particles of sandstone or Tuff.

4. A surface coating as claimed in claim 3, wherein said calcined bauxite has a particle size of between 1 mm and 3 mm.

5. A surface coating as claimed claim 1, wherein the skid resistance value (SRV) of the coating is at least 70.

6. A method of making a high friction surface coating comprising the steps of applying a resin binder to the road surface substrate and broadcasting an aggregate over the resin binder, wherein said aggregate comprises a blend of calcined bauxite and particles of sandstone or Tuff having a particle size of between 1 mm and 3 mm.

7. A method of making a surface coating as claimed in claim 6, wherein said blend comprises a 50/50 ratio of said calcined bauxite to said particles of sandstone or Tuff.

8. A method of making a surface coating as claimed in claim 7, wherein said calcined bauxite has a particle size of between 1 mm and 3 mm.

9. A method of making a high friction surface coating comprising the steps of premixing an aggregate with a resin binder to form a mixture, heating said mixture and screeding said mixture over a road surface substrate, wherein said aggregate comprises a blend of calcined bauxite and particles of sandstone or Tuff having a particle size of between 1 mm and 3 mm.

10. A method of making a surface coating as claimed in claim 9, wherein said blend comprises a 50/50 ratio of said calcined bauxite to said particles of sandstone or Tuff.

11. A method of making a surface coating as claimed in claim 10, wherein said calcined bauxite has a particle size of between 1 mm and 3 mm.

* * * * *